(12) United States Patent
Bhatia et al.

(10) Patent No.: US 8,032,922 B2
(45) Date of Patent: Oct. 4, 2011

(54) METHOD AND APPARATUS FOR PROVIDING ACCESS TO AN APPLICATION-RESOURCE

(75) Inventors: Gaurav Bhatia, Foster City, CA (US); Kamalendu Biswas, Fremont, CA (US); David Wilson, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 980 days.

(21) Appl. No.: 11/641,297

(22) Filed: Dec. 18, 2006

(65) Prior Publication Data

US 2008/0148351 A1 Jun. 19, 2008

(51) Int. Cl.
G06F 7/04 (2006.01)
G06F 17/30 (2006.01)

(52) U.S. Cl. .......................................................... 726/2

(58) Field of Classification Search ....... 726/2; 713/166
See application file for complete search history.

(56) References Cited

U.S. PATENT DOCUMENTS

| | | | |
|---|---|---|---|
| 7,114,076 B2 * | 9/2006 | Callaghan | 713/182 |
| 7,185,364 B2 * | 2/2007 | Knouse et al. | 726/8 |
| 7,243,369 B2 * | 7/2007 | Bhat et al. | 726/6 |
| 7,353,281 B2 * | 4/2008 | New et al. | 709/229 |
| 7,673,135 B2 * | 3/2010 | Chin et al. | 713/159 |
| 2005/0193211 A1 * | 9/2005 | Kurose | 713/185 |

OTHER PUBLICATIONS

Vasanta et al., A User—Centric Anonymous Authorisation Framework in E-commerce Environment, May 2004, ACM.*

* cited by examiner

*Primary Examiner* — Vivek Srivastava
*Assistant Examiner* — Samuel Ambaye
(74) *Attorney, Agent, or Firm* — Shun Yao; Park, Vaughan, Fleming & Dowler LLP

(57) ABSTRACT

One embodiment of the present invention provides a system that provides access to an application-resource. During operation, the system receives a request to access an application-resource associated with an application, wherein the request is received at an application-server that hosts the application. The system then determines an authentication-level required to access the application-resource. Next, the system sends the required authentication-level to an authentication-server. In response, the system receives an authentication-response from the authentication-server. Next, the system determines if the authentication-response specifies that the user is authenticated to access the application-resource. If so, the system grants the user access to the application-resource.

One embodiment of the present invention provides a system that provides an authentication-token associated with a lower authentication-level in response to an authentication-token associated with a higher authentication-level expiring. Note that the lower authentication-level meets or exceeds a required authentication-level and does not require a user to re-authenticate.

30 Claims, 10 Drawing Sheets

METHOD AND APPARATUS FOR PROVIDING ACCESS TO AN APPLICATION-RESOURCE

BACKGROUND

1. Field of the Invention

The present invention relates to computer applications. More specifically, the present invention relates to a method and apparatus for providing access to an application-resource.

2. Related Art

Large organizations often use enterprise application-systems that include a large number of application-resources, such as application-screens and data. Typically, these large organizations want to be able to exert fine-grained control over their enterprise application-systems and their associated application-resources. Existing methods for providing this type of control are cumbersome and obtrusive.

For example, one commonly used method for exerting fine-grained control over enterprise application-systems involves maintaining several endpoints (e.g. URLs), wherein each end-point is associated with an authentication-level and a set of application-resources, which have the same authentication-level as the end-point. Furthermore, a different server typically hosts each end-point. Unfortunately, maintaining multiple end-points makes it hard to efficiently administer such a system. In addition, users who want to access multiple application-resources, which are associated with different end-points, are usually required to authenticate several times—once for each end-point. Furthermore, a user is often required to re-authenticate at an end-point that the user previously accessed because a session associated with the end-point expired while the user was accessing another end-point. This can create further frustration for the user.

Moreover, each time an organization wants to integrate a new application into an enterprise application-system, an administrator is typically required to configure each associated end-point to handle the new set of application-resources associated with the new application. This may also require new end-points to be created, which further increases the amount of effort involved in maintaining the enterprise application-system.

Hence, what is needed is a method and an apparatus for controlling access to application-resources without the problems listed above.

SUMMARY

One embodiment of the present invention provides a system that provides access to an application-resource. During operation, the system receives a request to access an application-resource associated with an application, wherein the request is received at an application-server that hosts the application. The system then determines an authentication-level required to access the application-resource. Next, the system sends the required authentication-level to an authentication-server. In response, the system receives an authentication-response from the authentication-server. Next, the system determines if the authentication-response specifies that the user is authenticated to access the application-resource. If so, the system grants the user access to the application-resource.

In a variation on this embodiment, the application-resource can include: a set of data; an application-screen; a set of operations supported by the application; and the application.

In a variation on this embodiment, receiving the authentication-response involves receiving an authentication-token. Note that the authentication-token can include: a user authentication-level, which specifies a level of authentication for a user who is associated with the request; an expiration time, which specifies when the user authentication-level expires; and an authentication-criteria indicator, which specifies authentication-criteria used to authenticate the user.

In a further variation, the system saves the authentication-token, thereby enabling the application to determine the user authentication-level without contacting the authentication-server again.

In a further variation, upon receiving a subsequent request to access a second application-resource, the system determines if the user authentication-level matches a second authentication-level required to access the second application-resource. If so, the system grants the user access to the second application-resource. If not, the system sends the required second authentication-level to the authentication-server. In response, the system receives a second authentication-response from the authentication-server. Next, if the second authentication-response specifies that the user is authenticated to access the second application-resource, the system grants the user access to the second application-resource.

In a further variation, determining if the user authentication-level matches the required second authentication-level involves determining whether the authentication-token has expired.

In a further variation, the authentication-criteria can include: a user name/password pair; a digital certificate; a cryptographic key; a hardware-token; and a biometric identifier.

One embodiment of the present invention provides a system that provides fine-grained multi-level dynamic authentication. During operation, the system receives an authentication-request token at an authentication-server, wherein the authentication-server receives the authentication-request token from an application-server. Next, the system identifies a set of authentication-criteria associated with the authentication-request token. The system then requests the set of authentication-criteria from a user associated with the authentication-request token to determine a user authentication-level. The system also creates an authentication-token associated with the user authentication-level. Finally, the system sends the authentication-token to the application-server.

In a variation on this embodiment, the authentication-request token can include: a user identifier, which identifies the user; an authentication-criteria selection, which specifies the authentication-criteria with which to authenticate the user; and an authentication-level requirement, which specifies a level of authentication required to access an application-resource associated with the application-server.

In a variation on this embodiment, the authentication-token can include: the user authentication-level; an expiration time, which specifies when the user authentication-level expires; and an authentication-criteria indicator, which specifies the authentication-criteria used to authenticate the user.

In a variation on this embodiment, the system saves the authentication-token at the authentication-server, which enables the authentication-server to determine a second user authentication-level associated with the user without contacting the user again.

In a further variation, the system compares the user authentication-level to a required second authentication-level associated with the second authentication-request token. If the user authentication-level is lower than the required second authentication-level, the system proceeds with identifying a second set of authentication-criteria associated with the second authentication-request token.

In a further variation, if the user authentication-level matches the required second authentication-level, the system determines if the expiration time has been reached. If not, the system sends the authentication-token to the application-server. If so, the system proceeds with identifying the second set of authentication-criteria associated with the second authentication-request token.

In a further variation, if the user authentication-level exceeds the second authentication-level requirement, the system determines if the expiration time has been reached. If not, the system sends the authentication-token to the application-server. If so, the system determines if an unexpired authentication-level exists which is lower than the user authentication-level and matches or exceeds the second authentication-level requirement. If so, the system sends a second authentication-token associated with the unexpired authentication-level to the application-server. If not, the system proceeds with identifying the second set of authentication-criteria associated with the second authentication-request token.

In a variation on this embodiment, the authentication-criteria can include: a user name/password pair; a digital certificate; a cryptographic key; a hardware-token; and a biometric identifier.

DETAILED DESCRIPTION

Figure 1:
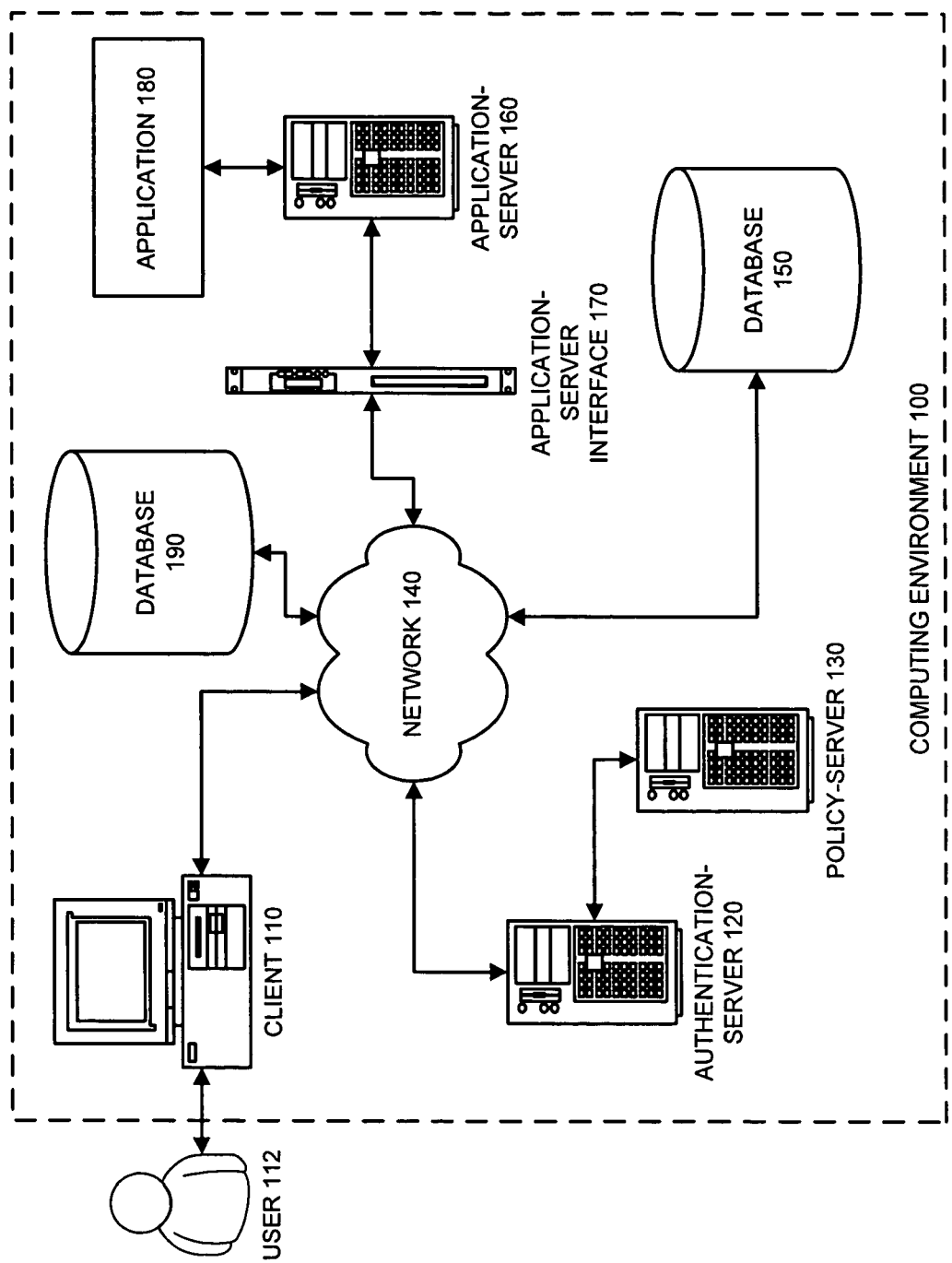
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention includes an application-server that provides dynamic fine-grained multi-level control over application-resources. During operation, the application-server receives a request from a user to access an application-resource. The application-server can then determine if the user is associated with an authentication-level that is sufficient to access the application-resource. If so, the application-server grants the user access to the application-resource. If not, the application-server requests that an authentication-server authenticate the user with an authentication-level sufficient to access the application-resource, wherein the application-server specifies the authentication-level. In response to receiving the request, the authentication-server authenticates the user and sends the result to the application-server. Based on the result of the attempts to authenticate the user, the application-server can then grant or reject access to the application-resource to the user.

In one embodiment of the present invention, the authentication-server searches for an existing authentication-token associated with the user. If the authentication-server finds an existing authentication-token associated with the user, the authentication-server determines if the existing authentication-token is associated with an authentication-level sufficient to fulfill the application-server's request. If so, and if the authentication-token has not expired, the authentication-server sends the authentication-token to the application-server. Note that this embodiment enables a user to access different application-resources associated with multiple applications without re-authenticating.

In one embodiment of the present invention, if the authentication-server finds an expired authentication-token associated with the user, the authentication-server can determine if the authentication-level associated with the authentication-token can be reduced to a lower authentication-level that is high enough to fulfill the application-server's request, and is associated with an expiration time which is long enough to still be unexpired. If so, the application-server "steps down" the user's authentication-level, and sends a new authentication-token associated with a reduced authentication-level to the application-server. Note that this embodiment reduces the number of times that a user authenticates when accessing multiple application-resources. Furthermore, this embodiment enables an application-server to provide fine-grained multi-level access control without the user authenticating separately for each level of access control.

In one embodiment of the present invention, the application-server and the authentication-server distinguish the different authentication-levels by considering the capabilities or the application-resources that a user associated with a given authentication-level can access. In this embodiment, if an authentication-level is associated with a set of capabilities, a lower authentication-level is associated with a subset of the capabilities, and a greater authentication-level is associated with a superset of the capabilities.

In one embodiment of the present invention, a developer of an application, or an administrator who can install and/or configure the application, specifies the authentication-levels and the capabilities and/or application-resources associated with the authentication-levels.

Figure 10A:
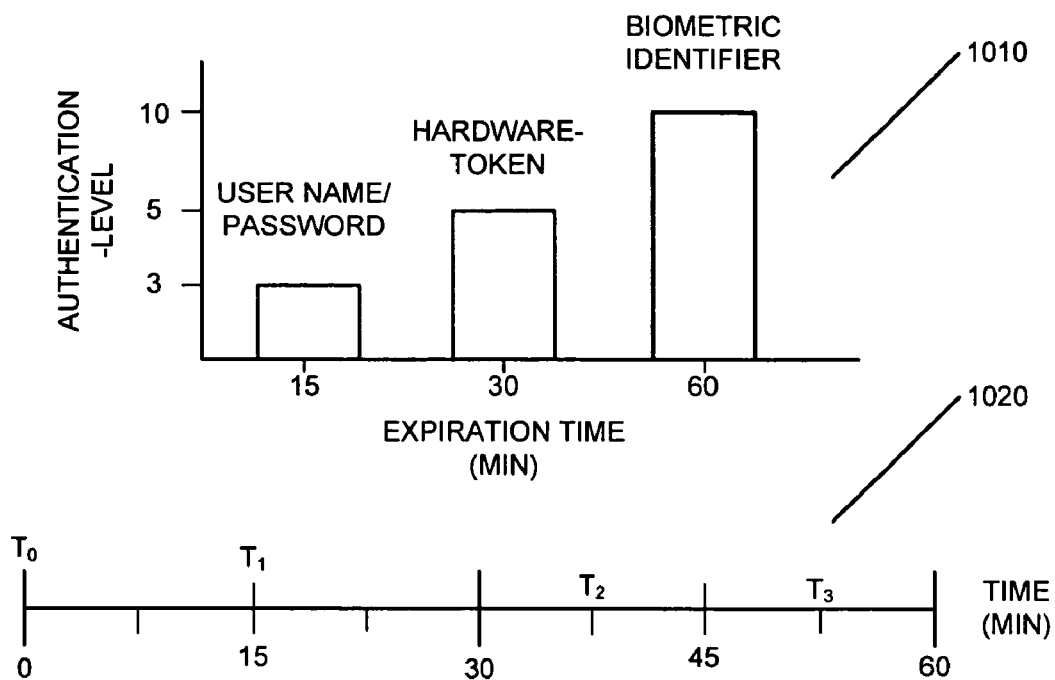
FIG. 10A presents a pair of graphs illustrating an embodiment of the present invention.

FIG. 10A presents a pair of graphs illustrating an embodiment of the present invention. Graph 1010 illustrates three authentication-criteria, which are each associated with an authentication-level and an expiration time. Graph 1020 illustrates a sample timeline. Referring to the pair of graphs in FIG. 10A, suppose that at time $T_1$ a user authenticates using a hardware-token. Starting at time $T_1$, the user can access any application-resource that is associated with an authentication-level that is less than or equal to five for the next 30 minutes. Therefore, although the user did not authenticate with a user name/password pair, at time $T_2$ the user can access any application resource associated with authentication-level three, or authentication-level five. However, the user cannot access an application-resource associated with authentication-level ten because the user did not authenticate with a biometric identifier. At time $T_3$, the user can no longer access an application-resource without first re-authenticating because the user's authentication-level, obtained by authenticating with the hardware-token at time $T_1$, has expired.

Figure 10B:
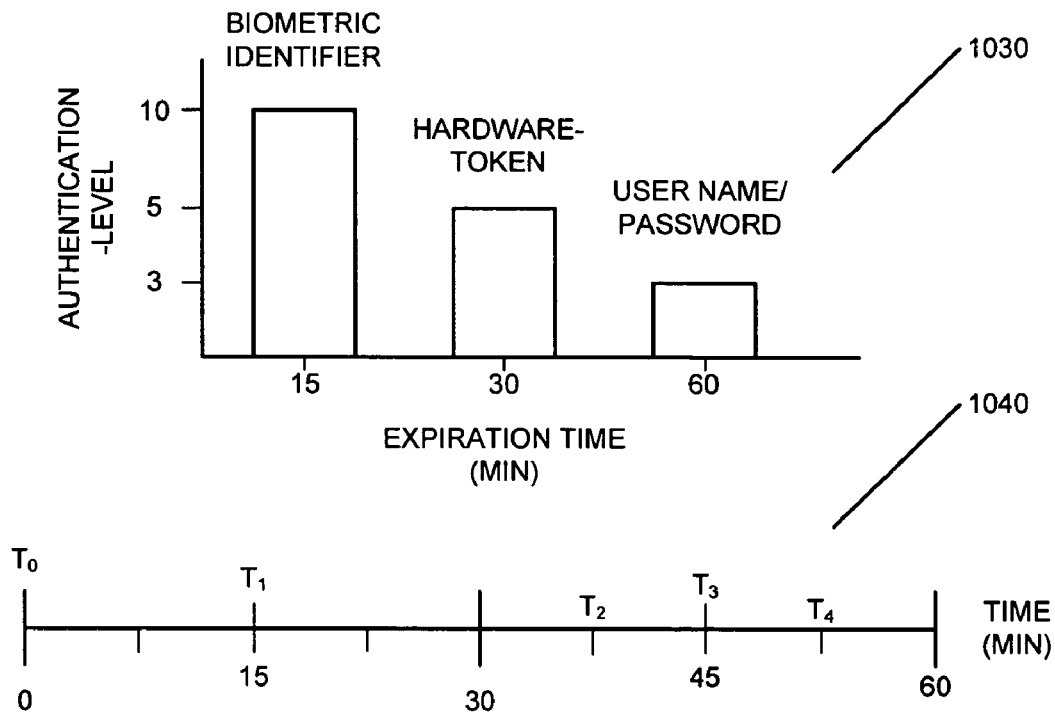
FIG. 10B presents a second pair of graphs illustrating an embodiment of the present invention.

FIG. 10B presents a second pair of graphs illustrating an embodiment of the present invention. Graph 1030 illustrates three authentication-criteria, which are each associated with an authentication-level and an expiration time. Graph 1040 illustrates a sample timeline. Referring to the pair of graphs in FIG. 10B, suppose that at time $T_1$ a user authenticates using a biometric identifier. As a result of this authentication, for the next 15 minutes, the user can access any application-resource that is associated with an authentication-level that is less than or equal to ten.

Suppose the user's authentication-token expires before time $T_2$. If at time $T_2$ the user wants to access an application-resource associated with an authentication-level of ten, the user is required to re-authenticate. However, if the user wants to access an application-resource associated with an authentication-level of five, an authentication-server determines that the user authenticated with a biometric identifier and thus, had an authentication-level of ten at time $T_1$. Furthermore, the authentication-server determines that if the user had authenticated with a hardware-token at time $T_1$, the user would be able to access the application-resource associated with the authentication-level of five. Therefore, the authentication-server "steps down" the original authentication-level associated with the user by allocating to the user a new authentication-token that is associated with an authentication-level of five. This new authentication-token expires at time $T_3$ because the authentication-server associates the new authentication-token with the expiration time the new authentication-token would be associated with if the authentication-server created the new authentication-token at time $T_1$, the time at which the authentication-server created the original authentication-token. Note that in this embodiment, the system creates a new authentication-token for the user without contacting the user.

Consider the situation where the user wants to access a second application-resource associated with an authentication-level of five at time $T_4$. Furthermore, there exists no unexpired authentication-tokens associated with the user. In this situation, the authentication-server determines that if the user had authenticated with a hardware-token at time $T_1$, the associated authentication-token would have expired before time $T_4$. Therefore, although the user was associated with an authentication-level of ten at time $T_1$, the user is required to re-authenticate at time $T_4$.

Computing Environment

FIG. 1 illustrates a computing environment 100 in accordance with an embodiment of the present invention. Computing environment 100 includes a number of computer systems. These computer systems can generally include any type of computer system based on a microprocessor, a mainframe computer, a digital signal processor, a portable computing device, a personal organizer, a device controller, or a computational engine within an appliance. More specifically, computing environment 100 includes client 110, authentication-server 120, policy-server 130, network 140, database 150, application-server 160, application-server interface 170, application 180, and database 190.

Client 110 can generally include any node on a network including computational capability and including a mechanism for communicating across the network. In one embodiment of the present invention, client 110 includes a browser, such as a web-browser, that is capable of communicating with application-server 160, application-server interface 170, and authentication-server 120.

Authentication-server 120 can generally include any system capable of authenticating a user or client.

Policy-server 130 can generally include any system capable of storing and maintaining a set of policies. For example, policy-server 130 can store and maintain a set of authentication-rules.

In one embodiment of the present invention, authentication-server 120 includes policy-server 130.

Network 140 can generally include any type of wired or wireless communication channel capable of coupling together computing nodes. This includes, but is not limited to, a local area network, a wide area network, or a combination of networks. In one embodiment of the present invention, network 140 comprises the Internet.

Databases 150 and 190 can generally include any type of system for storing data in non-volatile storage. This includes, but is not limited to, systems based upon magnetic, optical, and magneto-optical storage devices, as well as storage devices based on flash memory and/or battery-backed up memory.

In one embodiment of the present invention, application-server interface 170 has permission to access database 150, and authentication-server 120 has permission to access database 190.

In one embodiment of the present invention, authentication-server 120 includes database 190.

Application-server 160 can generally include any system capable of hosting and/or executing an application, such as application 180. In one embodiment of the present invention, application-server 160 is a web-server.

In one embodiment of the present invention, application-server 160 includes database 150.

Application-server interface 170 can generally include any middleware that facilitates communication between application-server 160 and authentication server 120, and between application-server 160 and client 110. Furthermore, application-server interface 170 can include any system that can restrict user 112's access to application-server 160 and application 180.

In one embodiment of the present invention, application-server 160 includes application-server interface 170.

Application 180 can generally include any application. In one embodiment of the present invention, application 180 includes any application that can selectively grant access to an application-resource associated with application 180.

In one embodiment of the present invention, suppose that user 112 wants to access an application-resource associated with application 180. To do so, user 112 uses client 110 to send a request to access the application-resource to application-server 160, which hosts application 180. Before the request reaches application-server 160, application-server interface 170 intercepts the request, which includes a user identifier associated with user 112. Then, application-server interface 170 searches database 150 for an authentication-token associated with the user identifier. In response to not finding an authentication-token associated with the user identifier, application-server interface 170 creates an authentication-request token, which includes an authentication-level required to access application 180 and the user identifier.

Application-server interface 170 then sends the authentication-request token to authentication-server 120. Upon receiving the authentication-request token, authentication-server 120 searches database 190 for an authentication-token associated with the user identifier. In response to not finding an authentication-token associated with the user identifier, authentication-server 120 looks up a set of authentication-criteria associated with the authentication-level on policy-server 130. Authentication-server 120 then requests that user 112 provide the set of authentication-criteria to facilitate authenticating user 112 at the authentication-level required to access the application-resource.

Upon authenticating user 112, authentication-server 120 creates an authentication-token, which includes the user identifier, the authentication-level, and context-information, such as an expiration time, associated with the authentication-level. Then, authentication-server 120 saves a copy of the authentication-token on database 190. Next, authentication-server 120 sends the authentication-token to application-server interface 170. In response to receiving the authentication-token, application-server interface 170 saves a copy of the authentication-token on database 150. Using this authentication-token, application-server interface 170 verifies that authentication-server 120 authenticated user 112 at the authentication-level required to access application 180. Once this verification is complete, application-server interface 170 sends the request to access the application-resource to application-server 160. After application-server 160 verifies that user 112 has the authentication-level required to access the application-resource, application-server 160 grants user 112 access to the application-resource.

In one embodiment of the present invention, suppose that application-server 160 determines that user 112 is not associated with the authentication-level required to access the application-resource. In this embodiment, application-server 160 sends the required authentication-level to application-server interface 170. In response to receiving the required authentication-level, application-server interface 170 creates a second authentication-request token. Application-server interface 170 then sends the second authentication-request token to authentication-server 120. In response to receiving the second authentication-request token, authentication-server 120 searches database 190 for an authentication-token associated with user 112.

Upon finding an authentication-token associated with user 112, authentication-server 120 examines the authentication-token and determines that user 112 is associated with a lower authentication-level than the authentication-level included in the authentication-request token. In response to determining that user 112 is associated with a lower authentication-level than the authentication-level included in the authentication-request token, authentication-server 120 looks up a set of authentication-criteria associated with the authentication-level included in the authentication-request token on policy-server 130. Authentication-server 120 then requests that user 112 provide the set of authentication-criteria to facilitate authenticating user 112 at the authentication-level required to access the application-resource. Upon authenticating user 112, authentication-server 120 creates an authentication-token and stores a copy of the authentication-token on database 150. Authentication-server 120 then sends the authentication-token to application-server 170, which forwards the authentication-token to application-server 160. Upon establishing that authentication-server 120 has authenticated user 112 at the authentication-level required to access the application-resource, application-server 160 grants user 112 access to the application-resource.

In one embodiment of the present invention, suppose that user 112 wants to access a second application-resource and sends to application-server interface 170 a request to access the second application-resource. Application-server interface 170, upon establishing that user 112 has the authentication-level required to access application 180, forwards the request to application-server 160. In response to receiving the request, application-server 160 retrieves from database 150 an authentication-level required to access the second application-resource and an authentication-token associated with user 112. Then, application-server 160 compares the required authentication-level to a user authentication-level associated with the authentication-token and determines that user 112 has a greater authentication-level than the required authentication-level; however, application-server 160 determines that the authentication-token has expired.

Next, application-server 160 sends the required authentication-level to application-server interface 170. In response to receiving the required authentication-level, application-server interface 170 creates an authentication-request token and sends the authentication-request token to authentication-server 120. Then, authentication-server 120 retrieves an authentication-token associated with user 112 from database 190. After establishing that the authentication-token is expired, authentication-server 120 compares the user authentication-level to the required authentication-level and determines that the user authentication-level is greater than the authentication-level.

Next, authentication-server 120 retrieves from policy-server 130 a list of authentication-levels which are lower than the user authentication-level, but are equal to or greater than the required authentication-level. Using the list, authentication-server 120 identifies an authentication-level that if substituted for the user authentication-level at the time (time $t_0$) when authentication-server 120 created the authentication-token, then the authentication-token would currently (time $t_1$) be unexpired. Authentication-server 120 then creates a new authentication-token that includes the newly identified authentication-level and a new expiration time. Note that the new expiration time is the difference between the expiration time of the newly identified authentication-level at $t_0$ and the current time, $t_1$.

Next, authentication-server 120 saves the newly created authentication-token on database 190 and then sends the newly created authentication-token to application-server interface 170. Application-server interface 170 then saves the newly created authentication-token on database 150 and forwards the newly created authentication-token to application-server 160. Then, after application-server 160 determines that the user authentication-level associated with the newly created authentication-token exceeds or equals the required authentication-level, application-server 160 grants user 112 access to the second application-resource. By "stepping down" the user authentication-level in this way, this embodiment enables authentication-server 120 to provide an authentication-token for user 112 without contacting user 112 again.

In one embodiment of the present invention, authentication-server 120 determines that there does not exist an authentication-level that would be unexpired at time $t_1$ if the authentication level was substituted for the user authentication-level at time $t_0$. In this situation, authentication-server 120 contacts user 112 to re-authenticate user 112 and create a new authentication-token.

Providing Access to an Application-Resource

Figure 2:
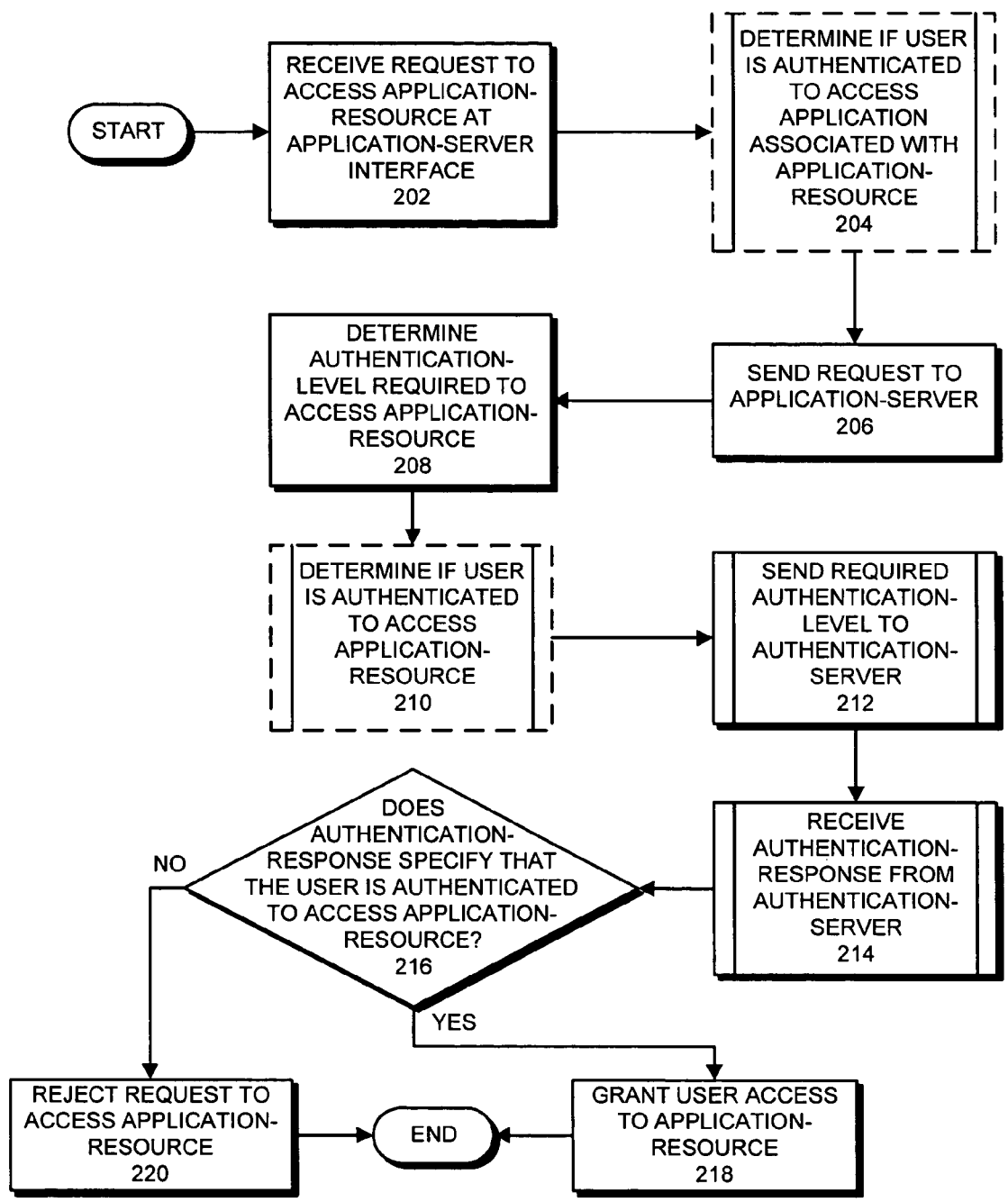
FIG. 2 presents a flowchart illustrating the process of providing access to an application-resource in accordance with an embodiment of the present invention.

FIG. 2 presents a flowchart illustrating the process of providing access to an application-resource in accordance with an embodiment of the present invention. The process begins when application-server interface 170 receives a request to access an application-resource (step 202). Note that an application-resource can include: a set of data, an application-screen, a set of operations supported by an application, the application, and any other type of application-resource known to those familiar with the art.

In one embodiment of the present invention, application-server interface 170 determines if user 112 is authenticated to access application 180, which is associated with the application-resource (step 204). Note that this is a multi-step process, which is described in more detail below with reference to FIG. 3. Furthermore, note that this step is optional as is illustrated by the dashed lines surrounding step 204.

Next, application-server interface 170 sends the request to application-server 160 (step 206). In response to receiving the request, application-server determines the authentication-level that user 112 is required to authenticate at before user 112 can be granted access to the application-resource (step 208). In one embodiment of the present invention, determining the required authentication-level may involve retrieving an authentication-level associated with the application-resource from database 150.

In one embodiment of the present invention, application-server 160 determines if user 112 is authenticated to access the application-resource (step 210). Note that this is a multi-step process, which is described in more detail below with reference to FIG. 4. Furthermore, note that this step is optional as is illustrated by the dashed lines surrounding step 210.

Application-server 160 then sends the required authentication-level to authentication-server 120 (step 212). Note that this is a multi-step process, which is described in more detail below with reference to FIG. 5. Next, application-server 160 receives an authentication-response from authentication-server 120 (step 214). Note that this is a multi-step process, which is described in more detail below with reference to FIG. 6.

After receiving the authentication-response, application-server 160 determines if the authentication-response specifies that user 112 is authenticated to access the application-resource (step 216). If so, application-server 160 grants user 112 access to the application-resource (step 218). If not, application-server 160 rejects user 112's request to access the application-resource (step 220). Note that determining if user 112 is authenticated to access the application-resource involves determining if a user authentication-level associated with the authentication-response is grater than or equal to the required authentication-level.

In one embodiment of the present invention, application-server interface 170 determines if the authentication-response specifies that user 112 is authenticated to access the application-resource. In this embodiment, application-server interface 170 decides whether to grant user 112 access to the application-resource or to reject user 112's request to access the application-resource.

Determining Permission to Access an Application

Figure 3:
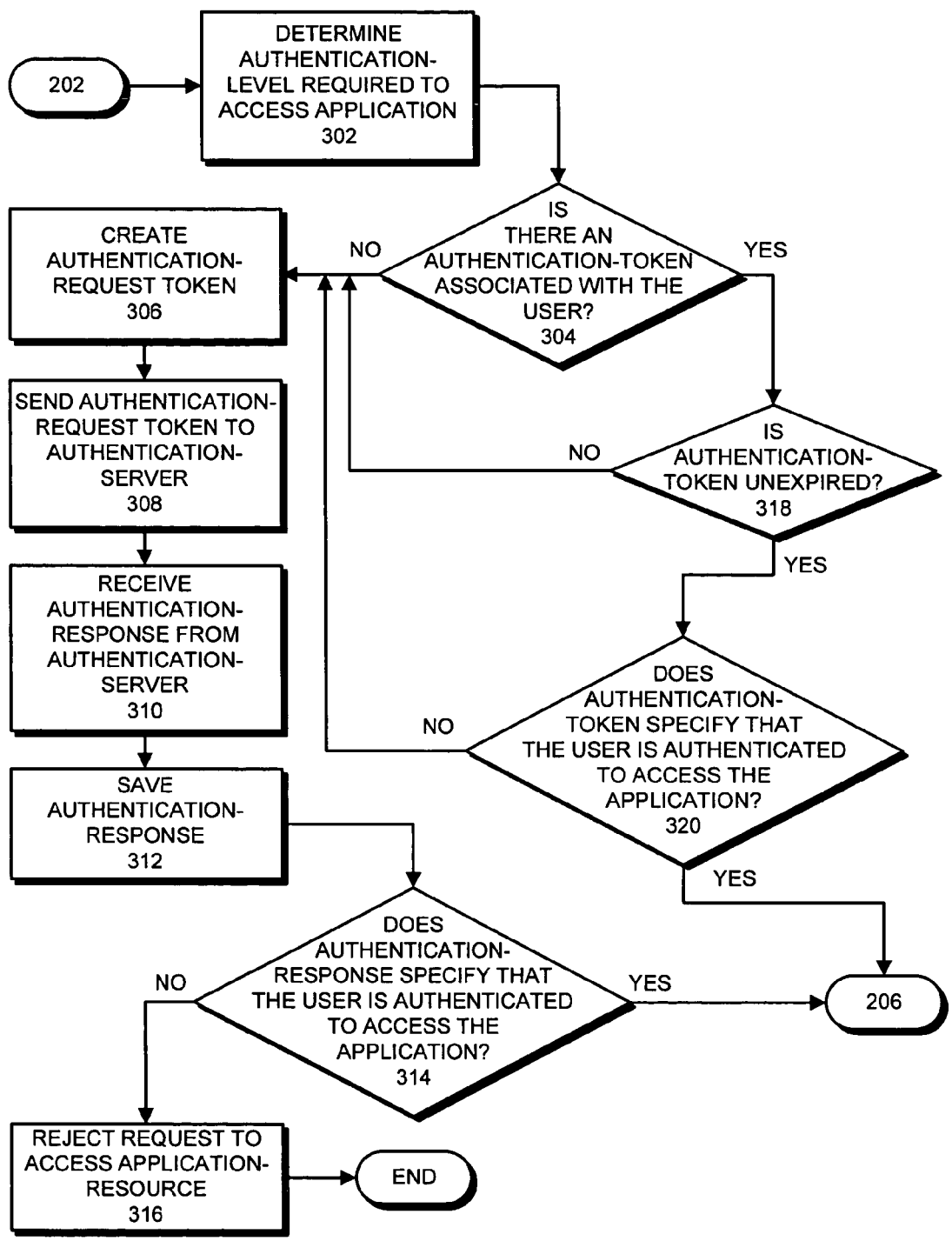
FIG. 3 presents a flowchart illustrating the process of determining if a user has permission to access an application in accordance with an embodiment of the present invention.

FIG. 3 presents a flowchart illustrating the process of determining if a user 112 has permission to access an application 180 in accordance with an embodiment of the present invention. The process begins when application-server interface 170 determines an authentication-level required to access application 180 (step 302). Next, application-server interface 170 determines if there is an authentication-token associated with user 112 (step 304). Note that this may involve searching database 150 for an authentication-token associated with user 112. If there is an authentication-token associated with user 112, application-server interface 170 determines if the authentication-token is unexpired (step 318). If so, application-server interface 170 determines if the authentication-token specifies that user 112 is authenticated to access application 180 (step 320). Note that this involves determining if a user authentication-level associated with the authentication-token is greater than or equal to the required authentication-level. If so, application-server interface 170 proceeds to step 206.

If an authentication-token associated with user 112 does not exist, or if an authentication-token associated with user 112 does exist, but is expired or does not specify that user 112 is authenticated to access application 180, application-server interface 170 creates an authentication-request token (step 306). Note that the authentication-request token can include: a user identifier, which identifies the user; an authentication-criteria selection, which specifies the authentication-criteria with which authentication-server 120 is to authenticate user 112; an authentication-level requirement, which specifies a level of authentication required to access the application-resource associated with application-server 160; and any other context-information that enables authentication-server 120 to authenticate user 112.

In one embodiment of the present invention, the authentication-request token does not include an authentication-criteria selection. In this embodiment, policy-server 130 stores the authentication-criteria selection that is associated with the authentication-level. To obtain the authentication-criteria selection, authentication-server 120 sends the authentication-request token to policy-server 120, and in response receives the authentication-criteria associated with the required authentication-level included in the authentication-request token.

Next, application-server interface 170 sends the authentication-request token to authentication-server 120 (step 308). In response, application-server interface 170 receives an authentication-response from authentication-server 120 (step 310). Note that receiving the authentication-response can involve receiving an authentication-token, which can include: a user authentication-level, which specifies a level of authentication associated with user 112; an expiration time, which specifies when the user authentication-level expires; an authentication-criteria indicator, which specifies an authentication-criteria that authentication-server 120 used to authenticate user 112; and any other authentication-token data that facilitates application-server interface 170 determining if the authentication-response specifies that user 112 is authenticated to access application 180.

Next, application-server interface 170 saves the authentication-response on database 150 (step 312). Saving the authentication-response enables application-server interface 170 to determine user 112's authentication-level without contacting authentication-server 120 again.

Application-server interface 170 then determines if the authentication-response specifies that user 112 is authenticated to access application 180 (step 314). Note that this involves determining if a user authentication-level associated with the authentication-response is equal to or greater than the required authentication-level. If so, application-server interface 170 proceeds to step 206. If not, application-server interface 170 rejects user 112's request to access the application-resource because user 112 failed to obtain access to application 180 (step 316).

Determining Permission to Access an Application-Resource

Figure 4:
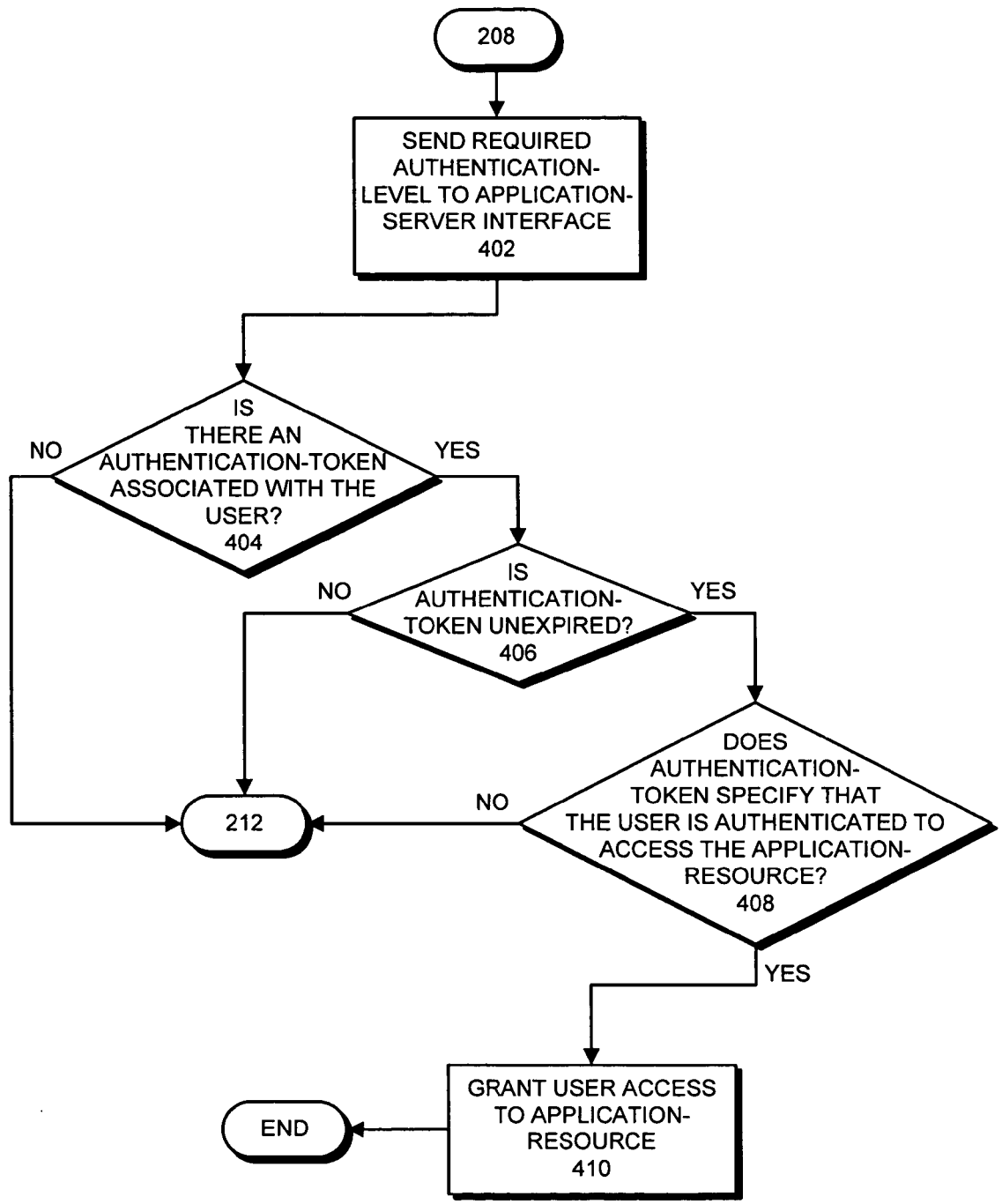
FIG. 4 presents a flowchart illustrating the process of determining if a user has permission to access an application-resource in accordance with an embodiment of the present invention.

FIG. 4 presents a flowchart illustrating the process of determining if a user 112 has permission to access an application-resource in accordance with an embodiment of the present invention. The process begins when application-server 160 sends a required authentication-level to application-server interface 170 (step 402). In response to receiving the required authentication-level, application-server interface 170 determines if an authentication-token associated with user 112 exists (step 404). Note that this may involve searching database 150 for the authentication-token. If there does exist an authentication-token associated with user 112, application-server interface 170 determines if the authentication-token is unexpired (step 406). If so, application-server interface 170 determines if the authentication-token specifies that user 112 has an authentication-level high enough to access the application-resource (step 408). If so, application-server interface 170 grants user 112 access to the application-resource (step 410). This may involve application-server interface 170 informing application-server 160 of user 112's authentication-level.

If an authentication-token associated with user 112 does not exist, or if an authentication-token associated with user 112 does exist, but is expired or does not specify that user 112 is authenticated to access the application-resource, application-server 160 proceeds to step 212.

Sending an Authentication-Level Requirement

Figure 5:
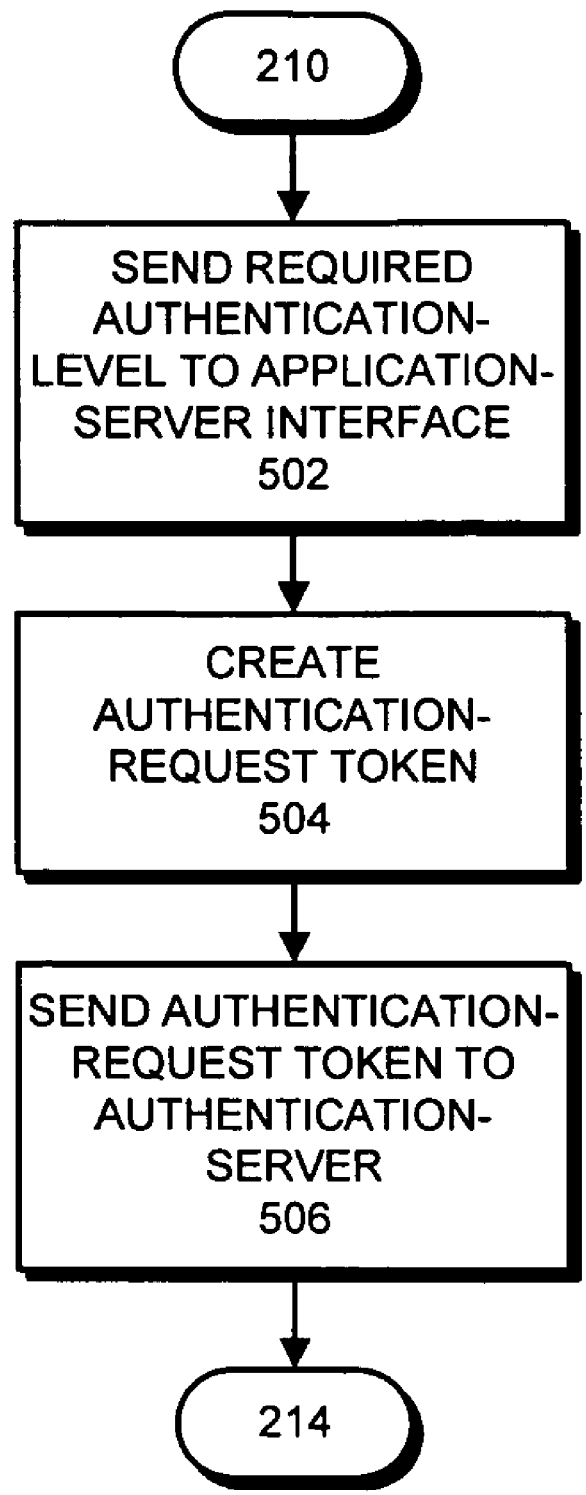
FIG. 5 presents a flowchart illustrating the process of sending an authentication-level requirement to an authentication-server in accordance with an embodiment of the present invention.

FIG. 5 presents a flowchart illustrating the process of sending an authentication-level requirement to an authentication-server 120 in accordance with an embodiment of the present invention. The process begins when application-server 160 sends an authentication-level which is required to access an application-resource to application-server interface 170 (step 502). In response to receiving the required authentication-level, application-server interface 170 creates an authentication-request token (step 504). Then, application-server interface 170 sends the authentication-request token to authentication-server 120 (step 506). Note that this may involve sending the authentication-request token to client 110, which then sends the authentication-request token to authentication-server 120.

Receiving an Authentication-Response

Figure 6:
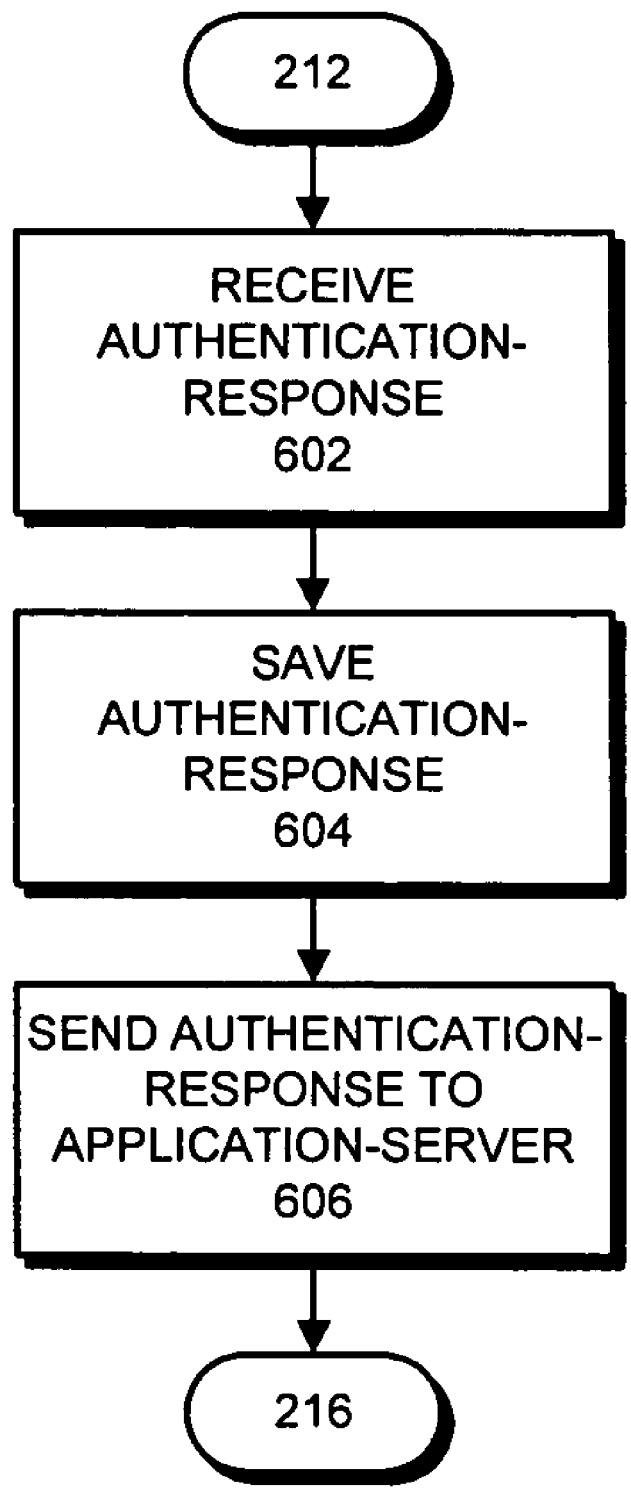
FIG. 6 presents a flowchart illustrating the process of receiving an authentication-response from an authentication-server in accordance with an embodiment of the present invention.

FIG. 6 presents a flowchart illustrating the process of receiving an authentication-response from an authentication-server 120 in accordance with an embodiment of the present invention. The process begins when application-server interface 170 receives an authentication-response from authentication-server 120 (step 602). Note that the authentication-response can include an authentication-token. Furthermore, not that application-server interface 170 may receive the authentication-response from client 110, which receives the authentication-response from authentication-server 120. Next, application-server interface 170 saves a copy of the authentication-response (step 604). This may involve saving the authentication-response on database 150. Application-server interface 170 then sends the authentication-response to application-server 160 (step 606).

Authenticating a User

Figure 7:
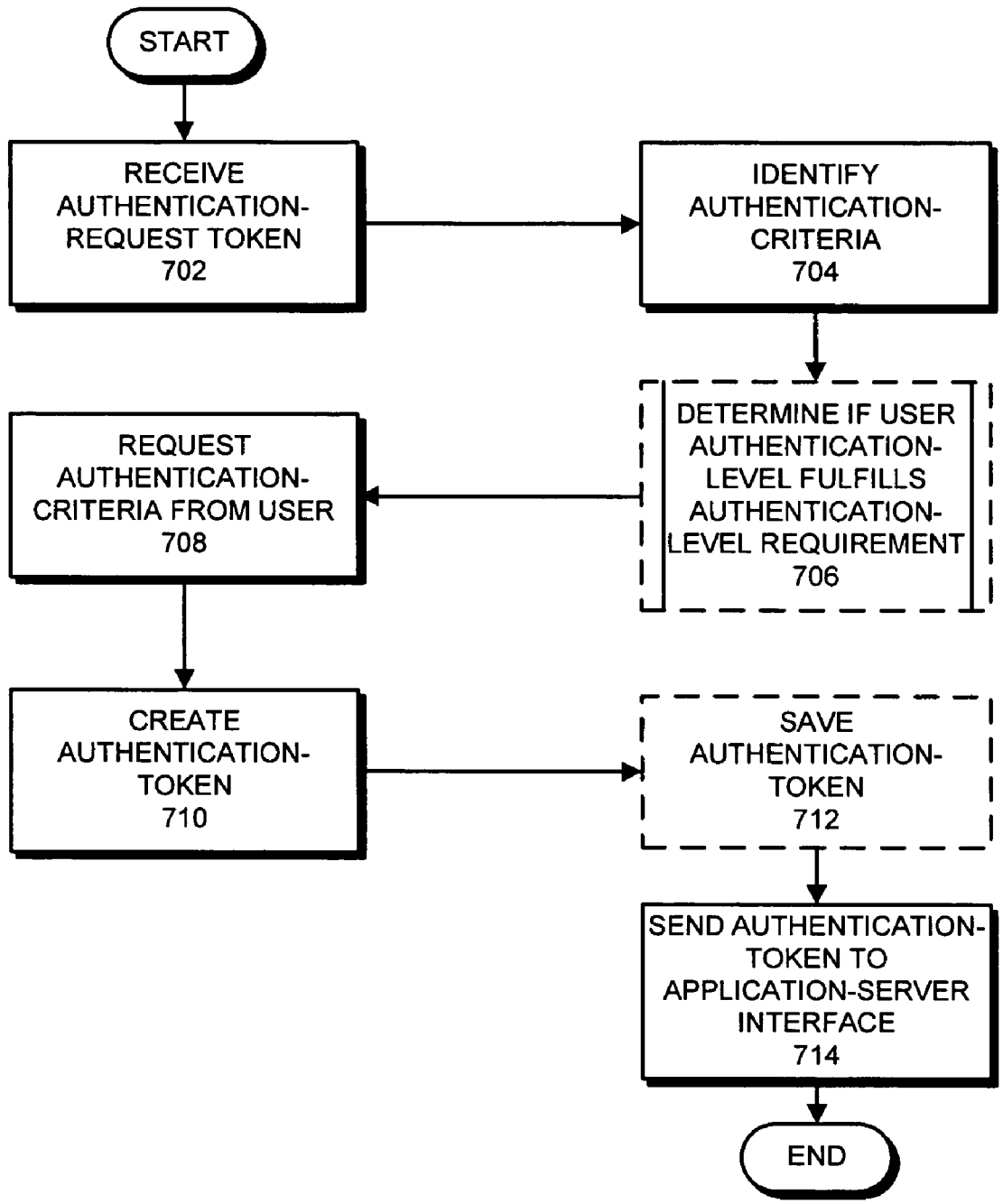
FIG. 7 presents a flowchart illustrating the process of authenticating a user in accordance with an embodiment of the present invention.

FIG. 7 presents a flowchart illustrating the process of authenticating a user 112 in accordance with an embodiment of the present invention. The process begins when authentication-server 120 receives an authentication-request token from application-server interface 170 instructing authentication-server 120 to authenticate user 112 (step 702). Next, authentication-server 120 identifies authentication-criteria for authenticating user 112 associated with the authentication-request token (step 704). Note that the authentication-criteria can include: a user name/password pair; a digital certificate; a cryptographic key; a hardware-token; a biometric identifier; and any other authentication-criteria that can be used to authenticate user 112 known to those familiar with the art. Furthermore, note that identifying authentication-criteria may involve identifying context-information, such as a required authentication-level or client 110's location.

In one embodiment of the present invention, identifying authentication-criteria involves examining the authentication-request token to obtain the authentication-criteria.

In one embodiment of the present invention, identifying authentication-criteria involves retrieving the authentication-criteria associated with the required authentication-level from policy-server 130. This may involve searching database 190 for authentication-criteria associated with the required authentication-level.

Authentication-server 120 then determines if a user-authentication level associated with user 112 fulfills the authentication-level requirement (step 706). Note that this involves determining if user 112 is associated with a user authentication-level. Furthermore, note that this is a multi-step process, which is described in more detail below with reference to FIG. 8 and FIG. 9. Moreover, note that this step is optional as is illustrated by the dashed lines surrounding step 706.

If authentication-server 120 does not execute optional step 706, or if authentication-server 120 determines that the user authentication-level does not fulfill the authentication-level requirement, authentication-server 120 requests the authentication-criteria identified in step 704 from user 112 (step 708). Authentication-server 120 then creates an authentication-token, which includes a response to the request for the authentication-criteria from user 112 (step 710).

In one embodiment of the present invention, authentication-server 120 saves a copy of the authentication-token (step 712). In this embodiment, authentication-server 120 may save the authentication-token on database 190. Note that this is an optional step as is illustrated by the dashed lines surrounding step 712.

Then, authentication-server 120 sends the authentication-token to application-server interface 170 (step 714).

In one embodiment of the present invention, user 112 does not provide the requested authentication-criteria to authentication-server 120 or provides invalid authentication-criteria to authentication-server 120. In this embodiment, authentication-server 120 sends a response to application-server interface 170 indicating that user 112 failed to authenticate at the authentication-level associated with the authentication-request token.

Determining if a User is Authenticated

Figure 8:
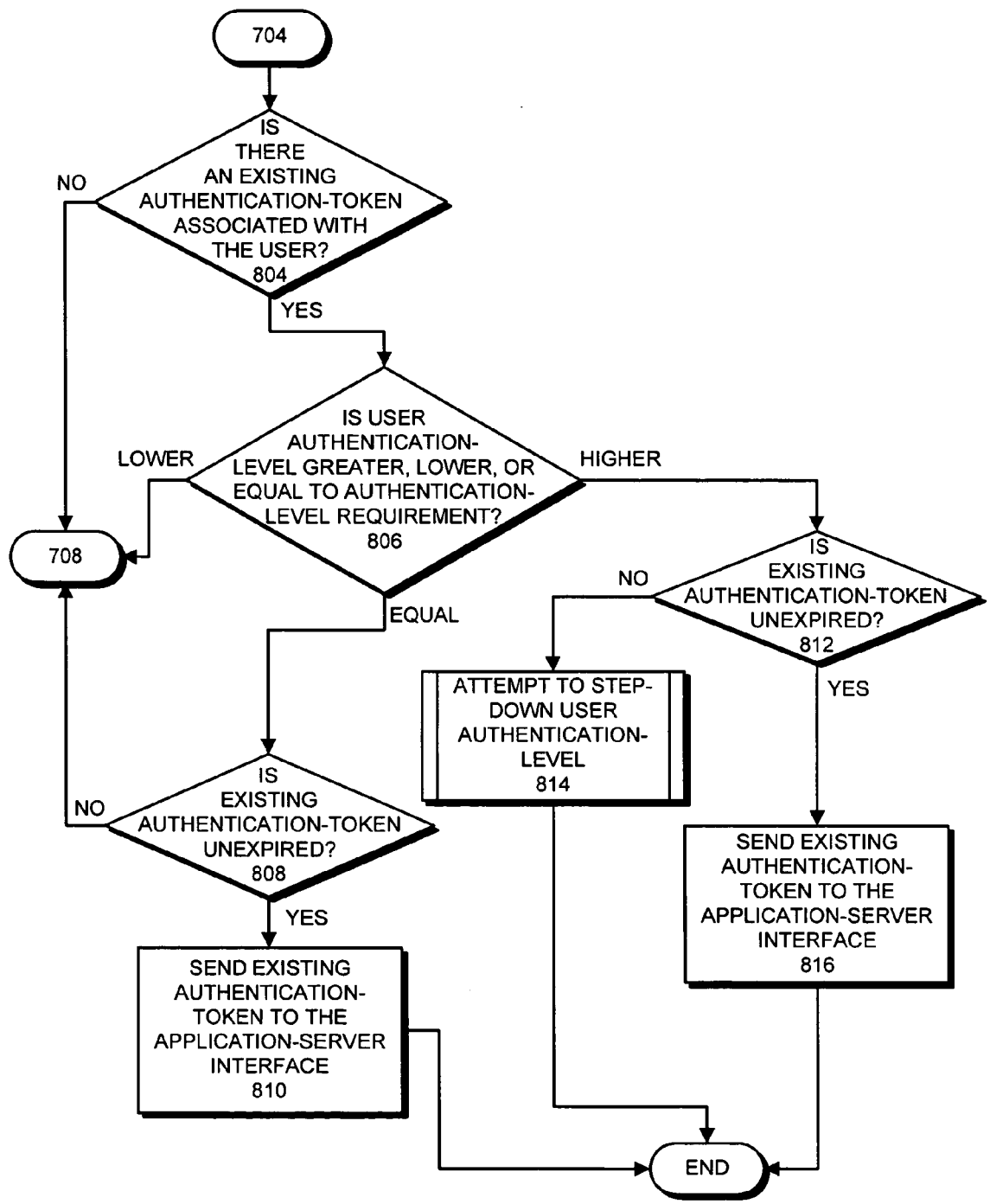
FIG. 8 presents a flowchart illustrating the process of determining if a user is authenticated in accordance with an embodiment of the present invention.

FIG. 8 presents a flowchart illustrating the process of determining if a user 112 is authenticated in accordance with an embodiment of the present invention. The process begins when authentication-server 120 determines if there is an existing authentication-token associated with user 112 (step 804). If not, authentication-server 120 proceeds to step 708. If so, authentication-server 120 determines if a user authentication-level associated with the existing authentication-token is greater, lower, or equal to the authentication-level requirement (step 806). If the user authentication-level is lower than the required authentication-level, authentication-server 120 proceeds to step 708. If the user authentication-level is equal to the required authentication-level, authentication-server 120 determines if the existing authentication-token is unexpired (step 808). If the existing authentication-token has expired, authentication-server 120 proceeds to step 708. If the existing authentication-token has not expired, authentication-server 120 sends the authentication-token to application-server interface 170 (step 810). At this point, the processes illustrated in FIG. 8 and FIG. 7 conclude.

If the user authentication-level is greater than the required authentication-level, authentication-server 120 determines if the existing authentication-token is unexpired (step 812). If the existing authentication-token has not expired, authentication-server 120 sends the existing authentication-token to application-server interface 170 (step 816). If the existing authentication-token has expired, authentication-server 120 attempts to step-down the user authentication-level associated with user 112 (step 814). This is a multi-step process, which is described in more detail below with reference to FIG. 9.

Stepping-Down a User Authentication-Level

Figure 9:
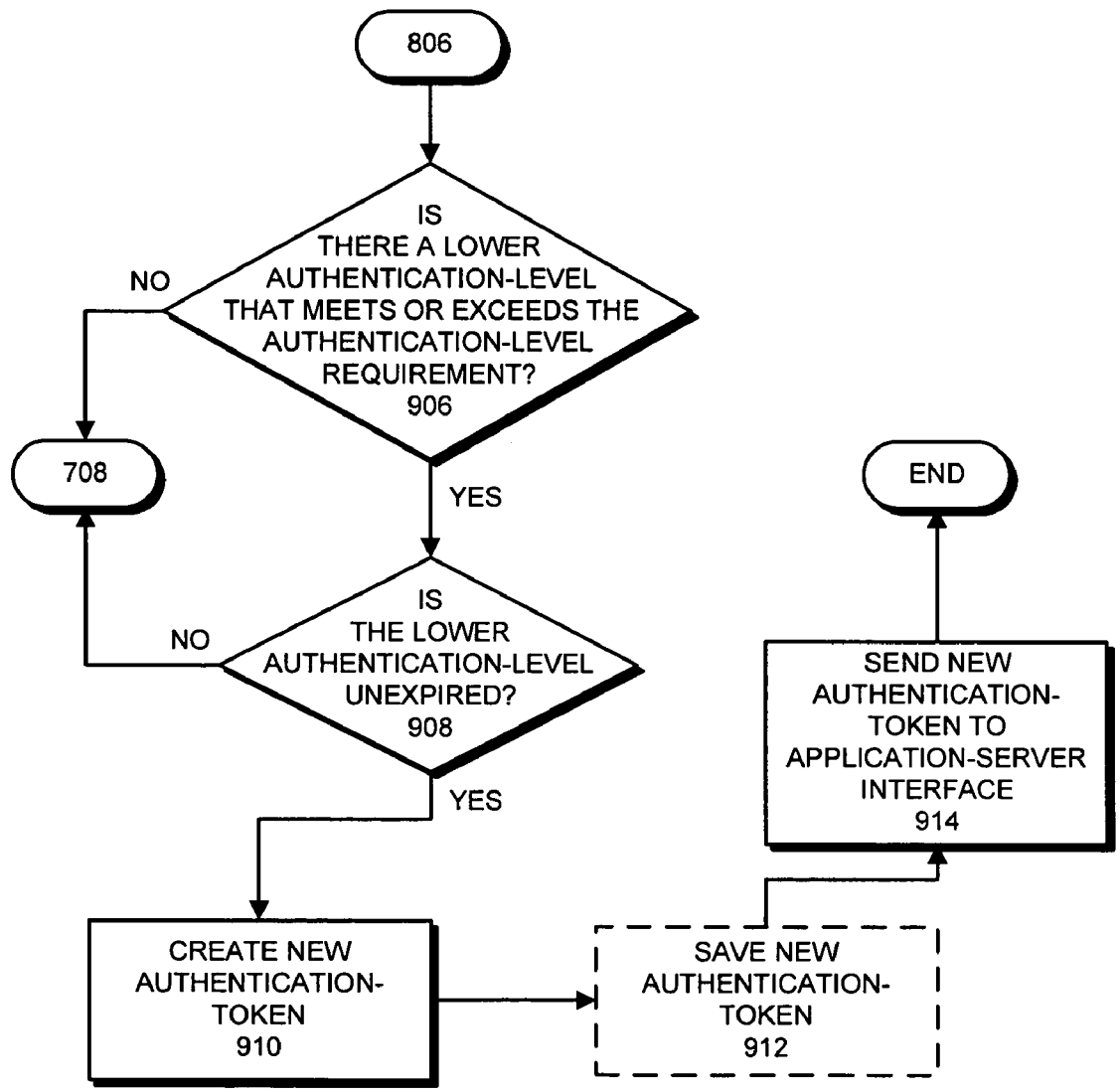
FIG. 9 presents a flowchart illustrating the process of stepping-down a user authentication-level in accordance with an embodiment of the present invention.

FIG. 9 presents a flowchart illustrating the process of stepping-down a user authentication-level in accordance with an embodiment of the present invention. The process begins when authentication-server 120 determines if there exists an authentication-level that is lower than a user authentication-level associated with user 112's expired existing authentication-token and that meets or exceeds the required authentication-level (step 906). If not, authentication-server 120 proceeds to step 708. If so, authentication-server 120 determines if the lower authentication-level is unexpired (step 908).

In one embodiment of the present invention, determining if the lower authentication-level is unexpired involves authentication-server 120 comparing the present time to the time that the lower authentication-level would expire if authentication-server 120 associated the lower authentication-level with user 112 at the point in time authentication-server 120 created the existing authentication-token.

If authentication-server 120 determines that the lower authentication-level is not unexpired, authentication-server 120 proceeds to step 708. If authentication-server 120 determines that the lower authentication-level is unexpired, authentication-server 120 creates a new authentication-token associated with the lower authentication-level (step 910).

In one embodiment of the present invention, authentication-server 120 associates a new expiration time with the new authentication-token. In this embodiment, the new expiration time is the value of the expiration time that would be remaining if authentication-server 120 had associated the lower authentication-level with the existing authentication-token when authentication-server 120 created the existing authentication-token.

Next, authentication-server 120 saves a copy of the new authentication-token (step 912). This may involve saving the copy of the new authentication-token on database 190. This step is optional as is illustrated by the dashed lines surrounding step 912.

Authentication-server 120 then sends the new authentication-token to application-server interface 170 (step 914).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing access to an application resource, comprising:
   receiving, at an application server, a request to access an application resource associated with an application;
   determining, by the application server, a first authentication level that is required to access the application resource;
   sending the first authentication level to an authentication server;
   receiving, from the authentication server, an authentication response that includes a first authentication token, which identifies a third authentication level that is higher than both the first authentication level and a second authentication level, wherein the second authentication level is higher than or equal to the first authentication level and corresponds to a longer expiration time than the third authentication level;
   determining that the authentication token identifying the third authentication level is expired and that a second authentication token identifying the second authentication level is unexpired;
   receiving the second authentication token comprising the second authentication level; and
   granting the user access to the application resource in response to receiving the second authentication token.

2. The method of claim 1, wherein the application resource includes:
   a set of data;
   an application screen;
   a set of operations supported by the application; and
   the application.

3. The method of claim 1, wherein the authentication token includes:
   a user authentication level, which specifies a level of authentication for a user associated with the request;
   an expiration time, which specifies when the user authentication level expires; and
   an authentication criteria indicator, which specifies authentication criteria used to authenticate the user.

4. The method of claim 3, further comprising saving the authentication token, thereby enabling the application to determine the authentication level associated with the user without contacting the authentication server.

5. The method of claim 4, wherein upon receiving a subsequent request to access a second application resource, the method further comprises:
   determining if the second authentication level matches another authentication level required to access the second application resource;
   if so, granting the user access to the second application resource; and if not,
    sending the other authentication level required to access the second application resource to the authentication server;
    receiving a second authentication response from the authentication server; and
    if the second authentication response specifies that the user is authenticated to access the second application resource, granting the user access to the second application resource.

6. The method of claim 5, wherein determining if the second authentication level matches the other authentication level required to access the second application resource involves determining if the expiration time associated with the second authentication token has not been reached.

7. The method of claim 3, wherein the authentication criteria include:
    a user name/password pair;
    a digital certificate;
    a cryptographic key;
    a hardware token; and
    a biometric identifier.

8. A method for providing fine-grained multi-level dynamic authentication, comprising:
    receiving an authentication-request token at an authentication server from an application server, wherein the authentication-request token identifies a first authentication level that is required to access an application resource;
    identifying a set of authentication criteria associated with the authentication-request token;
    requesting the set of authentication criteria from a user associated with the authentication-request token to determine a third authentication level that is higher than both the first authentication level and a second authentication level, wherein the second authentication level is higher than or equal to the first authentication level and corresponds to a longer expiration time than the third authentication level;
    creating a first authentication token associated with the third authentication level;
    sending the first authentication token to the application server;
    storing the first authentication token at the authentication server;
    receiving a second authentication-request token at the authentication server;
    determining that the first authentication token identifying the third authentication level is expired and that a second authentication token identifying the second authentication level is unexpired;
    sending the second authentication token comprising the second authentication level to the application server.

9. The method of claim 8, wherein the authentication-request token can include:
    a user identifier, which identifies the user;
    an authentication criteria selection, which specifies the authentication criteria with which to authenticate the user; and
    an authentication level requirement, which specifies a level of authentication required to access an application resource associated with the application server.

10. The method of claim 8, wherein the authentication token can include:
    the user authentication level;
    an expiration time, which specifies when the user authentication level expires; and
    an authentication criteria indicator, which specifies the authentication criteria used to authenticate the user.

11. The method of claim 8, wherein after receiving the second authentication-request token, the method further comprises:
    comparing the third authentication level to another authentication level associated with the second authentication-request token; and
    if the third authentication level is lower than the other authentication level associated with the second authentication-request token, identifying a second set of authentication criteria associated with the second authentication-request token.

12. The method of claim 11, wherein if the third authentication level matches the other authentication level associated with the second authentication-request token, the method further comprises:
    determining whether the expiration time associated with the second authentication-request token has been reached,
    responsive to the expiration time not having been reached, sending the authentication token to the application server, and
    responsive to the expiration time having been reached, identifying the second set of authentication criteria associated with the second authentication-request token.

13. The method of claim 11, wherein if the third authentication level is higher than the other authentication level associated with the second authentication-request token, the method further comprises:
    determining if the expiration time has been reached,
    if not, sending the authentication token to the application server, and
    if so, determining if an unexpired authentication level exists which is lower than the third authentication level and is higher than or equal to the other authentication level associated with the second authentication-request token,
        if so, sending a second authentication token associated with the authentication level to the application server, and
        if not, identifying the second set of authentication criteria associated with the second authentication-request token.

14. The method of claim 8, wherein the authentication criteria includes:
    a user name/password pair;
    a digital certificate;
    a cryptographic key;
    a hardware token; and
    a biometric identifier.

15. A non-transitory computer-readable storage medium storing instructions that when executed by a computer cause the computer to perform a method for providing access to an application resource, wherein the method further comprises:
    receiving at an application server a request to access an application resource associated with an application;
    determining a first authentication level that is required to access the application resource;
    sending the first authentication level to an authentication server;
    receiving, from the authentication server, a first authentication response that includes a first authentication token which identifies a third authentication level that is higher than both the first authentication level and a second authentication level, wherein the second authentication level is higher than or equal to the first authentication level and corresponds to a longer expiration time than the third authentication level;

determining that the authentication token identifying the third authentication level is expired and that a second authentication token identifying the second authentication level is unexpired;

receiving the second authentication token comprising the second authentication level; and granting the user access to the application resource in response to receiving the second authentication token.

16. The non-transitory computer-readable storage medium of claim 15, wherein the application resource includes:
   a set of data;
   an application screen;
   a set of operations supported by the application; and
   the application.

17. The non-transitory computer-readable storage medium of claim 15, wherein the authentication token includes:
   a user authentication level, which specifies a level of authentication for a user associated with the request;
   an expiration time, which specifies when the user authentication level expires; and
   an authentication criteria indicator, which specifies authentication criteria used to authenticate the user.

18. The non-transitory computer-readable storage medium of claim 17, wherein the method further comprises saving the authentication token, thereby enabling the application to determine the authentication level associated with the user without contacting the authentication server.

19. The non-transitory computer-readable storage medium of claim 18, wherein upon receiving a subsequent request to access a second application resource, the method further comprises:
   determining if the second authentication level matches another authentication level required to access the second application resource;
   if so, granting the user access to the second application resource; and
   if not,
      sending the other authentication level required to access the second application resource to the authentication server;
      receiving a second authentication response from the authentication server; and
      if the second authentication response specifies that the user is authenticated to access the second application resource, granting the user access to the second application resource.

20. The non-transitory computer-readable storage medium of claim 19, wherein determining if the second authentication level matches the other authentication level required to access the second application resource involves determining if the expiration time associated with the second authentication token has not been reached.

21. The non-transitory computer-readable storage medium of claim 18, wherein the authentication criteria can include:
   a user name/password pair;
   a digital certificate;
   a cryptographic key;
   a hardware token; and
   a biometric identifier.

22. A non-transitory computer-readable storage medium storing instructions that when executed by a computer cause the computer to perform a method for providing fine-grained multi-level dynamic authentication, wherein the method comprises:
   receiving an authentication-request token at an authentication server from an application server, wherein the authentication-request token identifies a first authentication level that is required to access an application resource;
   identifying a set of authentication criteria associated with the authentication-request token;
   requesting the set of authentication criteria from a user associated with the authentication-request token to determine a third authentication level that is higher than both the first authentication level and a second authentication level, wherein the second authentication level is higher than or equal to the first authentication level and corresponds to a longer expiration time than the third authentication level;
   creating a first authentication token associated with the third authentication level;
   sending the first authentication token to the application server;
   storing the first authentication token at the authentication server;
   receiving a second authentication-request token at the authentication server;
   determining that the first authentication token identifying the third authentication level is expired and that a second authentication token identifying the second authentication level is unexpired;
   sending the second authentication token comprising the second authentication level to the application server.

23. The non-transitory computer-readable storage medium of claim 22, wherein the authentication-request token includes:
   a user identifier, which identifies the user;
   an authentication criteria selection, which specifies the authentication criteria with which to authenticate the user; and
   an authentication level requirement, which specifies a level of authentication required to access an application resource associated with the application server.

24. The non-transitory computer-readable storage medium of claim 22, wherein the authentication token includes:
   the user authentication level;
   an expiration time, which specifies when the user authentication level expires; and
   an authentication criteria indicator, which specifies the authentication criteria used to authenticate the user.

25. The non-transitory computer-readable storage medium of claim 22, wherein after receiving the second authentication-request token, the method further comprises:
   comparing the third authentication level to another authentication level associated with the second authentication-request token; and
   if the third authentication level is lower than the other authentication level associated with the second authentication-request token, identifying a second set of authentication criteria associated with the second authentication-request token.

26. The non-transitory computer-readable storage medium of claim 25, wherein if the third authentication level matches the other authentication level associated with the second authentication-request token, the method further comprises:
   determining whether the expiration time associated with the second authentication-request token has been reached,
   responsive to the expiration time not having been reached, sending the authentication token to the application server, and responsive to the expiration time having been reached, identifying the second set of authentication criteria associated with the second authentication-request token.

27. The non-transitory computer-readable storage medium of claim 25, wherein if the third authentication level is higher than the other authentication level associated with the second authentication-request token, the method further comprises:
   determining if the expiration time has been reached,
      if not, sending the authentication token to the application server, and
      if so, determining if an unexpired authentication level exists which is lower than the third authentication level and is higher than or equal to the other authentication level associated with the second authentication-request token,
         if so, sending a second authentication token associated with the authentication level to the application server, and
         if not, identifying the second set of authentication criteria associated with the second authentication-request token.

28. The non-transitory computer-readable storage medium of claim 22, wherein the authentication criteria includes:
   a user name/password pair;
   a digital certificate;
   a cryptographic key;
   a hardware token; and
   a biometric identifier.

29. An apparatus that provides access to an application resource, comprising:
   a processor;
   a memory;
   a receiving mechanism that receives at an application server a request to access an application resource associated with an application;
   a determination mechanism that determines a first authentication level that is required to access the application resource;
   a sending mechanism that sends the first authentication level to an authentication server;
   wherein the receiving mechanism further receives, from the authentication server, a first authentication response that includes a first authentication token, which identifies a third authentication level that is higher than both the first authentication level and a second authentication level, wherein the second authentication level is higher than or equal to the first authentication level and corresponds to a longer expiration time than the third authentication level;
   wherein the determination mechanism further determines that the authentication token identifying the third authentication level is expired and that a second authentication token identifying the second authentication level is unexpired;
   wherein the receiving mechanism further receives the second authentication token comprising the second authentication level; and
   a granting mechanism that grants the user access to the application resource in response to the receiving mechanism receiving the second authentication token.

30. An apparatus that provides fine-grained multi-level dynamic authentication, comprising:
   a processor;
   a memory;
   a receiving mechanism that receives an authentication-request token at an authentication server from an application server, wherein the authentication-request token identifies a first authentication level that is required to access an application resource;
   an identification mechanism that identifies a set of authentication criteria associated with the authentication-request token;
   a requesting mechanism that requests the set of authentication criteria from a user associated with the authentication-request token to determine a third authentication level that is higher than both the first authentication level and a second authentication level, wherein the second authentication level is higher than or equal to the first authentication level and corresponds to a longer expiration time than the third authentication level;
   a creation mechanism that creates a first authentication token associated with the third authentication level;
   a sending mechanism that sends the first authentication token to the application server;
   a storing mechanism that stores the first authentication token at the authentication server;
   wherein the receiving mechanism further receives a second authentication-request token at the authentication server;
   a determination mechanism determines that the first authentication token identifying the third authentication level is expired and that a second authentication token identifying the second authentication level is unexpired; and
   wherein the sending mechanism further sends the second authentication token comprising the second authentication level to the application server.

* * * * *

UNITED STATES PATENT AND TRADEMARK OFFICE
CERTIFICATE OF CORRECTION

| | | |
|---|---|---|
| PATENT NO. | : 8,032,922 B2 | Page 1 of 1 |
| APPLICATION NO. | : 11/641297 | |
| DATED | : October 4, 2011 | |
| INVENTOR(S) | : Bhatia et al. | |

It is certified that error appears in the above-identified patent and that said Letters Patent is hereby corrected as shown below:

In column 10, line 2, delete "grater" and insert -- greater --, therefor.

Signed and Sealed this
Third Day of January, 2012

David J. Kappos
*Director of the United States Patent and Trademark Office*